Feb. 13, 1934.  R. MATTISON  1,947,271

PROCESS FOR PRODUCING DECORATIVE MATERIAL

Filed May 9, 1932

INVENTOR
Royal Mattison
by Edwards, Bower & Pool
ATTORNEYS

Patented Feb. 13, 1934

1,947,271

UNITED STATES PATENT OFFICE 1,947,271

PROCESS FOR PRODUCING DECORATIVE MATERIAL

Royal Mattison, Ambler, Pa., assignor to Ambler Asbestos Shingle & Sheathing Company, Ambler, Pa., a corporation of Pennsylvania Application May 9, 1932. Serial No. 610,277

3 Claims. (Cl. 41—29)

This invention relates to the production of sheet tiling and particularly to such tiling of asbestos cement material.

The object of the invention is to provide a method of forming the tile surface with great accuracy and avoiding or overcoming defects inherent in the materials or tending to appear during the process of manufacture.

In the accompanying drawing illustrating the invention

Figs. 1, 2, 3, 4, 5 and 6 are perspective views illustrating successive steps in the process, and Figs. 1a, 2a, 3a, 4a, 5a and 6a are typical cross sectional views of the sheet in Figs. 1, 2, 3, 4, 5 and 6, respectively.

Figure 1:
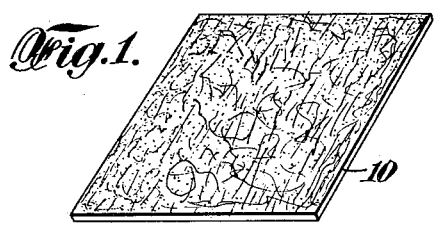
Figure 2:
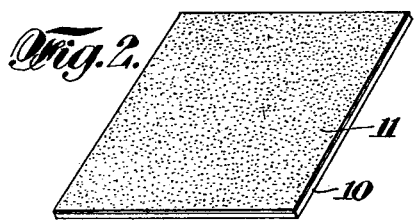
Figure 1A:
Figure 2A:
Figure 3:
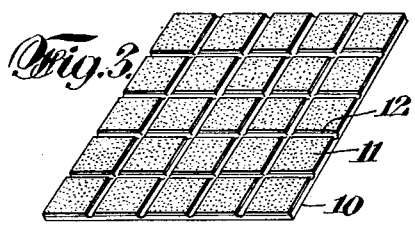
Figure 3A:

As shown in Fig. 1 the base material 10 is preferably a rigid sheet of asbestos and Portland cement material impregnated with a waterproofing material hardened by oxidation. Such a sheet may be first provided with a surface coating such as the lacquer layer 11 (Figs. 2 and 2a) and the face of the lacquer may be polished for instance by pressing. The "cement" lines 12 of the tiling are formed by scoring slightly into the asbestos cement material so that the characteristic color of this material shows as the fastening for the "tiles". (Figs. 3 and 3a.)

Figure 4:
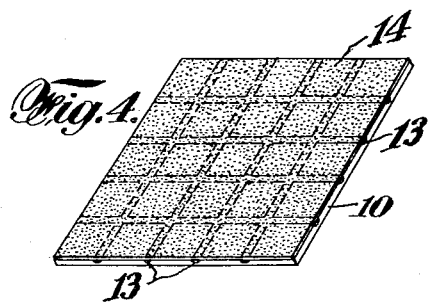
Figure 4A:
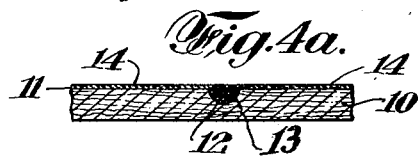
Figure 5:
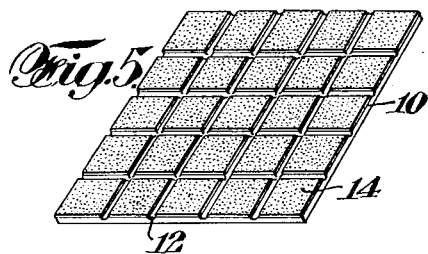
Figure 6:
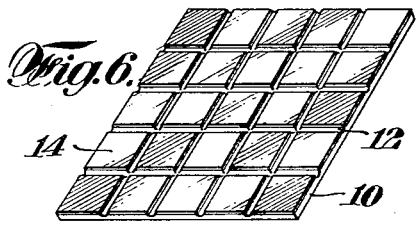
Figure 5A:
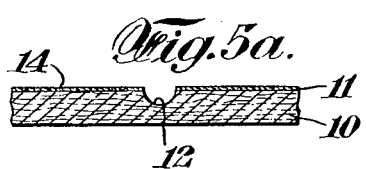
Figure 6A:

The score marks 12 may then be filled with a material 13 different from the sand and smoothed off even with the surface thereof. This filler 13 is such as to harden in place without too strong a bond with the material of the sheet, which is preferably impregnated or water-proofed so as not to be penetrated to any extent by the filler. After the hardening of the filler 13 a lacquer surface 14 is formed and hardened and then pressed to give a brilliant smooth surface (Figs. 4 and 4a). Then the filler is removed from the score marks either by another scoring (Figs. 5 and 5a) with the same machine used to make the grooves 12 or by simply removing the filler by scraping it out with a blunt tool.

The filler 13 for the score marks is a plastic cement, for instance, a mixture of Portland cement and wood flour, or a mixture of asbestos fiber dust and Portland cement. The use of wood pulp or asbestos fiber dust is due to the high water absorption rendering the mixture suitably plastic to enable deposition of cement in the score marks 12 when a handful of cement is rapidly rubbed over the face of the sheet. The surface or face of the sheet may be cleaned by the rubbing with a squeegee or similar manner. After approximately two hours drying, the surface of the sheet is cleaned with a cloth to insure removal of all dust or dirt particles. After this interval the cement is sufficiently set to resist removal during the cleaning operation. The sheet is then sprayed with the desired coats of lacquer, usually about three.

After drying of the lacquer, the cement is removed from the scorings in any suitable manner, or previous to such removal the lacquer surface may be finished and polished off in any desired manner. In removing the filler 13 it may be scraped with a rounded tool of the proper width to fit inside the scorings, the filler being easy removable due to the fact that it does not bond firmly with the sheet material. A preferred method of removing the filler 13 is to use the same abrasive wheels or other scoring means originally employed to form the grooves 12. By passing the sheet through the scoring machine the abrasive wheels will remove the filler without cutting through into the surface of the sheet.

If the lacquer surface of the sheet is not polished before the removal of the filler material, it will be polished after such removal (Figs. 6 and 6a) to give the final finish.

In the manufacture of such a sheet it sometimes happens that inherent defects are brought out or caused by the various steps of manufacture. Such defects result in irregularities in the finished tiling so that the material cannot be disposed of as perfect. Such "seconds" can generally be described as being defective because of removal of lacquer due to adhesion of the plates during pressing. Such defective spots usually are of an area of one square inch or less and may also be produced by a faulty plate or foreign material scratching or indenting the surface of the sheet. Accidental abuse may also mar the surface of the sheet to the extent where it cannot be placed into service as first class material. In such case the process of this invention with its filling of the groove recesses may be readily used to reclaim the sheet.

In such reclaiming, the defect is patched or puttied and the surface sanded smooth and brought flush with the face of the sheet. The score marks if not already filled are filled with the filling material 13 and refinished in a manner above described, and as a rule the resulting tiling surpasses in quality the standard product and can readily be disposed of as first grade material.

I claim:

1. A process for producing decorative effects comprising providing a sheet of asbestos-Portland cement material forming grooves in said sheet to simulate decorative lines, filling said grooves with a plastic material and permitting said material to set in place in said grooves, coating the surface of said sheet and material, finishing the surface of said coating and then removing said filling from said grooves to restore said decorative lines.

2. A process for producing decorative effects comprising providing a sheet of asbestos-Portland cement material, forming grooves in said sheet to simulate decorative lines, filling said grooves with a plastic material, coating the surface of said sheet and material, and then removing said filling from said grooves to restore said decorative lines.

3. A process for producing decorative effects comprising providing a sheet of asbestos-Portland cement material waterproofed by an impregnating oil, forming grooves in said sheet to simulate decorative lines, filling said grooves with a plastic material not penetrating the sheet material and permitting said material to set in place in said grooves, coating the surface of said sheet and material, finishing the surface of said coating, and then removing said material from said grooves to restore said decorative lines.

ROYAL MATTISON.